US006618001B2

(12) United States Patent
Oura

(10) Patent No.: US 6,618,001 B2
(45) Date of Patent: Sep. 9, 2003

(54) APPARATUS FOR DETECTING SIGNAL

(75) Inventor: Hideto Oura, Chiba (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/879,956

(22) Filed: Jun. 14, 2001

(65) Prior Publication Data

US 2002/0008658 A1 Jan. 24, 2002

(30) Foreign Application Priority Data

Jun. 16, 2000 (JP) .............................. 2000-181245

(51) Int. Cl.[7] .............................. G01S 13/00; G01S 7/35
(52) U.S. Cl. .............................. 342/91; 342/89; 342/98; 342/159; 342/175

(58) Field of Search .............................. 342/20, 89, 90, 342/91, 92, 93, 128–133, 159–175, 195, 101, 27, 28, 94, 95–103

(56) References Cited

U.S. PATENT DOCUMENTS 3,049,703 A * 8/1962 Davis ........................ 342/159
6,297,764 B1 * 10/2001 Wormington et al. ....... 342/101

* cited by examiner

Primary Examiner—Bernarr E. Gregory
(74) Attorney, Agent, or Firm—Venable LLP; Michael A. Sartori

(57) ABSTRACT

A radar signal detecting apparatus is provided. The radar signal detecting apparatus includes a coupler diverging a part of signal from received signal, a local oscillator outputting local signal, a mixer converting the diverged signal multiplied the local signal into low frequency signal and a detector detecting, a radar signal from the low frequency signal by using a threshold above side lobe.

8 Claims, 8 Drawing Sheets

APPARATUS FOR DETECTING SIGNAL

FIELD OF THE INVENTION

The invention relates to an apparatus for detecting signal in a radio communication system, and more specifically to a radar signal detecting apparatus for detecting an adjacent frequency radar signal.

BACKGROUND OF THE INVENTION

According to rapid progress of cellular phone on personal use, needs for radio communication have been increasing. Also, according to rapid progress of internet through radio, not only conventional speech communication but also data communication has been increasing and lack of radio frequency has been problem. In such a background, as one solution to the problem, it has been studied to use a new system together with a conventional system without interference in the same radio bandwidth. This is an essential subject from perspective for utilization of frequency.

Since transmitting signal from own system may interfere with other systems, it is a prerequisite condition that a new system does not interfere with a conventional system.

Generally, a radio apparatus in the new system is designed in consideration of spatial distance between the radio apparatus and an adjacent radar receiver and a transmitting signal level of the radar is measured for foundation of a new office to avoid interference of a transmitting signal of the radio apparatus in the new system to an adjacent radar receiver. But the measurement at the new office needs a lot of time and money, and when the radar performance and radio environment are changed, another measurement and design are needed. Moreover, establishment of many radio apparatuses will be the cause of complicated control.

Therefore, it is needed that a radar signal is measured automatically while the radio apparatuses are in use.

Concerning interference of a transmitting signal of the radio apparatus to the radar receiver, it is possible to estimate interference from the radio apparatus to the radar by measuring a communication characteristic from the radar to the radio apparatus. This method utilizes radio reversibility which can measure the communication characteristic if the radio apparatus receives a radar transmitting signal level for estimating the communication characteristic. It is possible to know whether the transmitting signal of the radio apparatus influences the radar and permissible transmitting power of the radio apparatus by estimating communication characteristic. And it is possible to stop transmitting from the radio apparatus and avoid interference at the worst. But there are problems hereinafter when the radio apparatus detects the radar signal level.

The radar has alternate time slot for transmitting and receiving signal. The transmitting signal is pulse shaped and has a short cycle. A reflected signal from an object is detected in the receiving time slot. Generally, the radar is rotated and detects the reflected signal. Therefore, the radio apparatus has to detect the pulse shaped signal and can not detect the radar signal during a receiving period. And the radio apparatus can only detect the radar signal brokenly because the radar rotates during the receiving period. For example, when a radar signal detecting level reaches to some level for detecting interference, the radio apparatus tries to avoid interference. But it is possible that the radio apparatus can not detect a radar level exactly because of a relation between the transmission interval of the radar signal and the rotational velocity of the radar. Especially, it is difficult to detect the radar level when a radar antenna has high gain and sharp directional characteristic.

If the radio apparatus which detects the radar signal level has a transmitting function, another problem will occurr. When the radar detecting level comes to low, it will be impossible to detect the radar signal level during the transmitting period of the radio apparatus because of interference of the apparatus' own transmitting signal.

When the radio apparatus uses TDD (Time Division Duplex) method, which repeats transmitting and receiving one after the other, for telecommunication as the radar, the radio apparatus needs to detect the radar signal separately from the repetition of the transmitting and receiving signals. But since the radio frequency of the radio apparatus and the radar are close, it is difficult for the radio apparatus to detect the radar signal during its own transmitting period. In this case, the radio apparatus can detect a radar signal during its own receiving period only when a radar transmits signal.

FIGS. 6 and 7 show transmitting and receiving timing of the radar and transmitting and receiving timing of the radio apparatus using TDD method. As shown in FIG. 6, when transmitting and receiving timing of the radar and the radio apparatus are synchronized completely, the radio apparatus can detect all transmitting signal from the radar. This is an unusual case. If the radio apparatus does not try to synchronize with the radar, it is impossible that the radio apparatus can detect all transmitting signal from the radar. Therefore, as shown in FIG. 7, it will be occur detectable time period and undetectable time period.

FIG. 8 shows variation of a receiving level at the radio apparatus, when the radar rotates. When the radar turns straight to the radio apparatus, the receiving level comes to maximum, and the receiving level changes suddenly near this angle. This is a case of sharp radar antenna characteristic. As shown in FIG. 8, it is difficult to detect the radar signal when the threshold or detecting range used by the radio apparatus are in the changeable period of the receiving level. Also as shown in FIG. 9, if the transmitting timing of the radar signal accords with the detecting range, it is difficult to detect the radar signal for interference of its own transmitting signal when the transmitting timing of the radar is same as the transmitting timing of the radio apparatus.

It is possible to spread a level detecting range to detect the radar signal, but system performance declines since a timing for halting signal or power control is too fast. For example, a maximum increase of antenna gain is about 10 dB per one cycle with parabola 4 meters in diameter directivity and 4 ms pulse cycle of the radar signal. This shows that beam width of the radar antenna is narrow and the detecting level in the radio apparatus changes with a range of 10 dB during pulse cycle of the radar signal in consideration of rotational velocity. The signal level will change with a range of 20 dB until next detecting timing by losing one detecting timing. Therefore, the radio apparatus needs to detect the radar signal every time and detects it with own transmitting timing or detect it by halting transmitting signal in a time period which is possible to receive the radar signal.

When the radio apparatus detects the radar signal by halting transmitting signal in the time period which is possible to receive a radar signal, the radio apparatus needs to halt signal with extra 20 dB margin once the radio apparatus has structure which can not detect the radar signal. Therefore, threshold for detecting the radar signal has to be lowered in consideration of the extra margin. It is difficult for the radio apparatus to detect all transmitting signals from the radar during own communication, and interference of the radio apparatus to the radar is a problem coming from radar rotation.

SUMMARY OF THE INVENTION

In order to address this need, the present invention provides a radar signal detecting apparatus for detecting an adjacent frequency radar signal.

According to one aspect of the present invention, for achieving the object, there is provided, as a specific configuration, a radar signal detecting apparatus including a coupler diverging a part of a signal from a received signal, a local oscillator outputting a local signal, a mixer converting the diverged signal multiplied the local signal into low frequency signal and a detector detecting a radar signal from the low frequency signal by using a threshold above a side lobe.

Preferably, the detector detects the radar signal by using a detecting level range between the threshold and below the side lobe, and halts or attenuates a transmitting signal when a received signal level is over the threshold.

Preferably, the coupler is a directional coupler comprised of micro strip line, and the directional coupler has tight coupling for signal from an antenna and loose coupling for signal from a transmitter.

DESCRIPTION OF THE PREFFERED EMBODIMENTS

Figure 1:
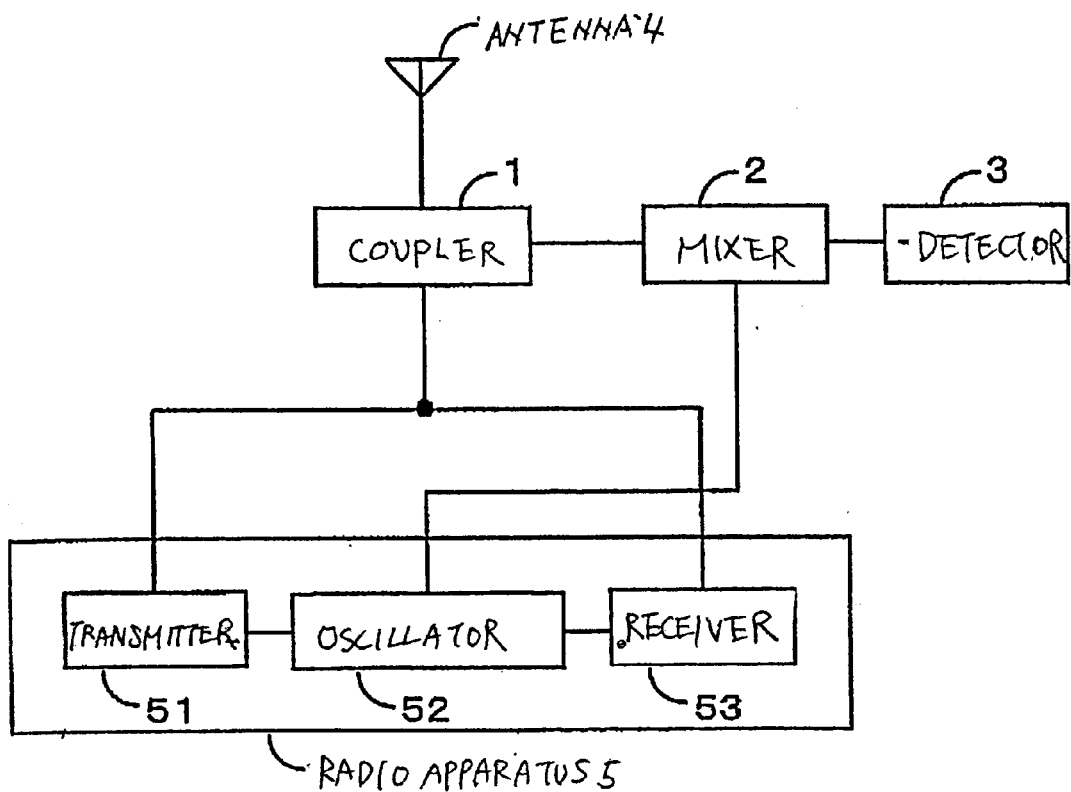
FIG. 1 is a block diagram of a radio apparatus using a detecting circuit.
Figure 5:
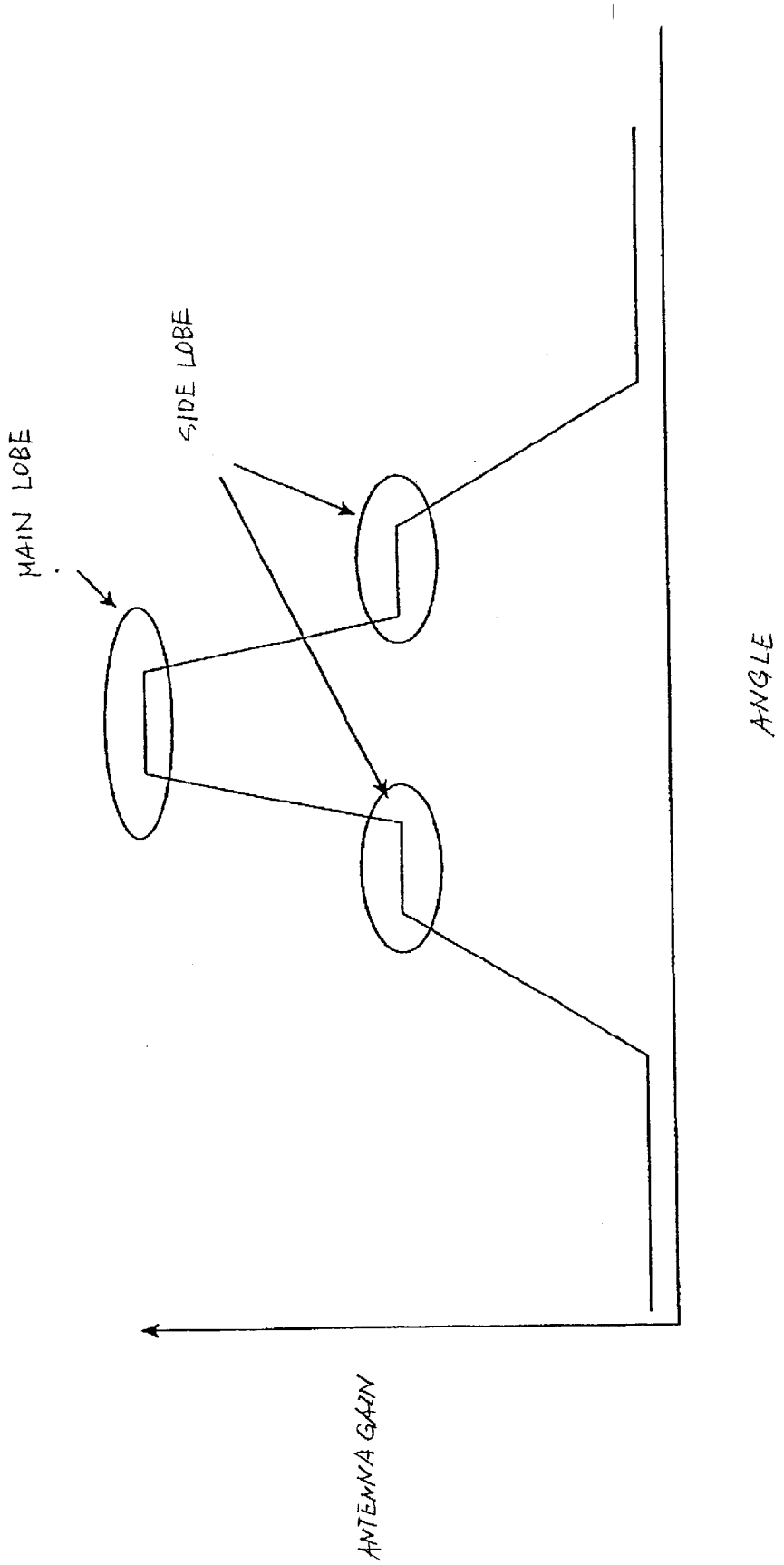
FIG. 5 shows a characteristic of general radar antenna.
Figure 6:
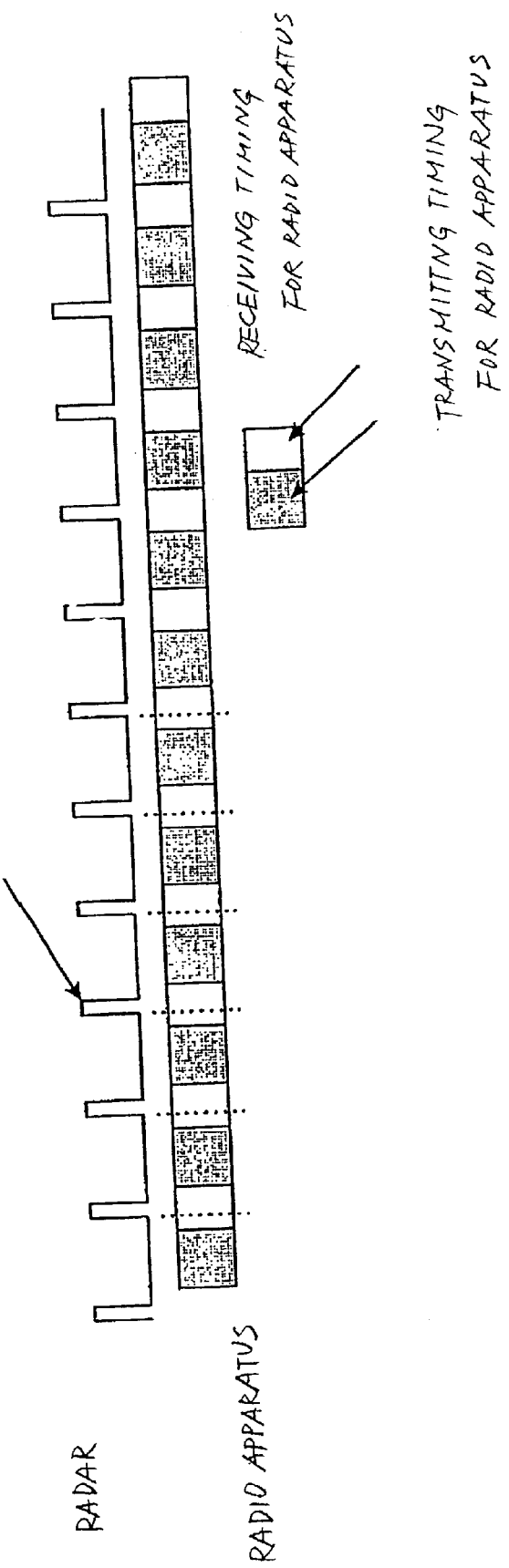
FIG. 6 shows a timing when transmitting and receiving timing of a radar and the radio apparatus are synchronized completely.
Figure 7:
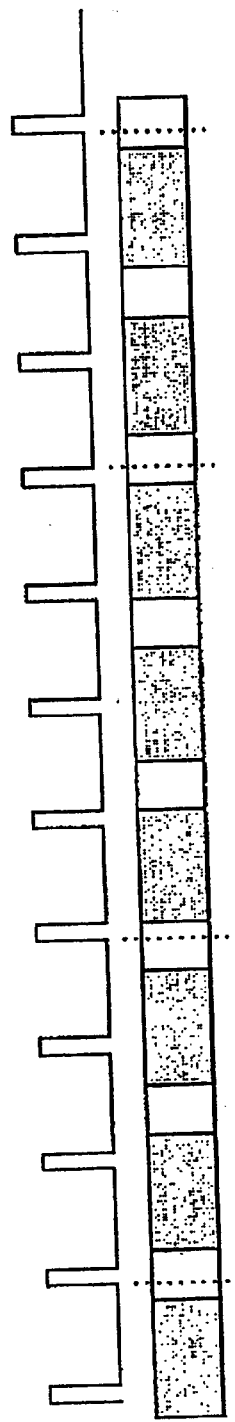
FIG. 7 shows a timing when transmitting and receiving timing of radar and radio apparatus are not synchronized completely.
Figure 8:
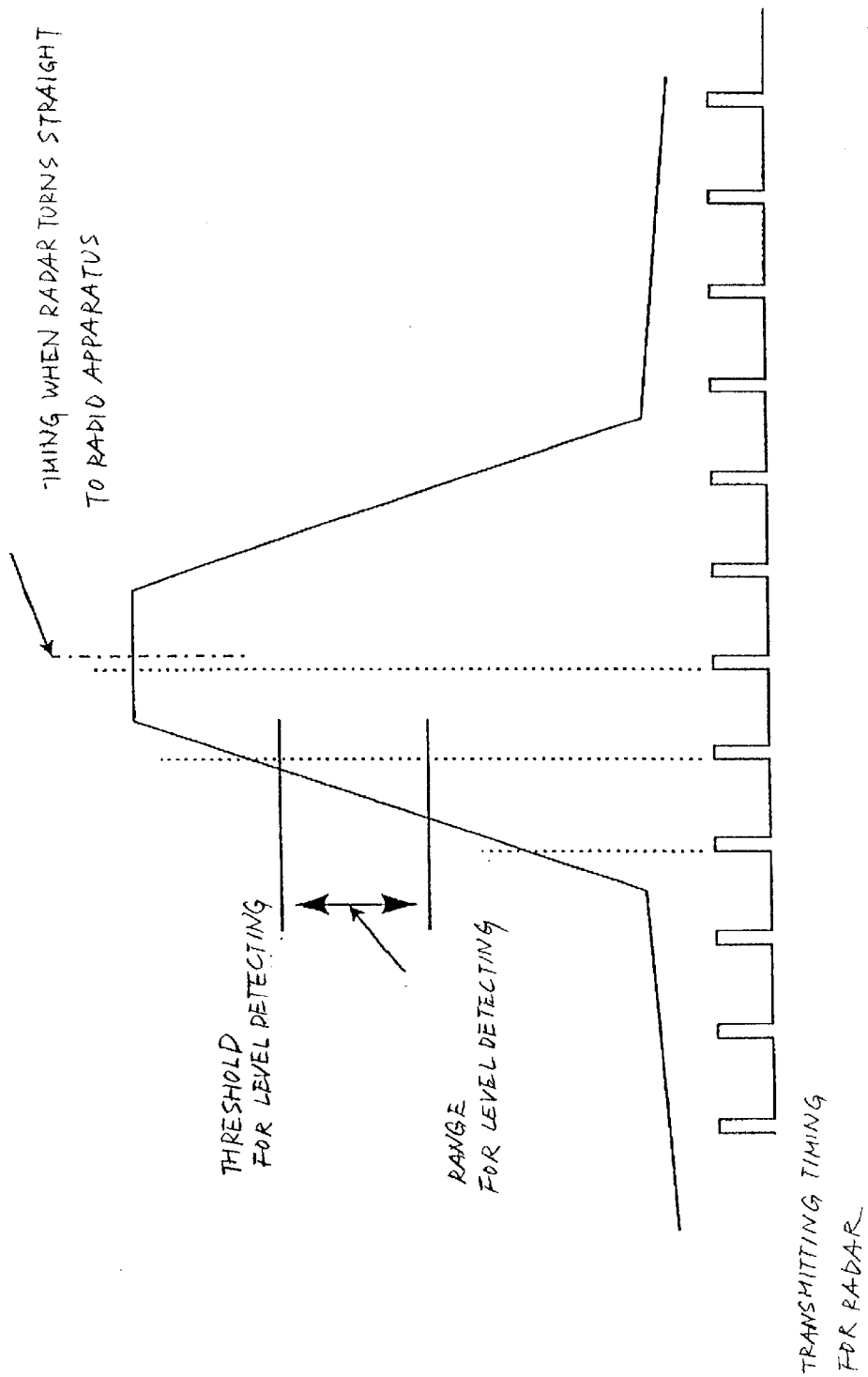
FIG. 8 shows a receiving level variation at the radio apparatus when a transmitting timing of a radar signal does not accord with a level detecting range because of a radar rotation.
Figure 9:
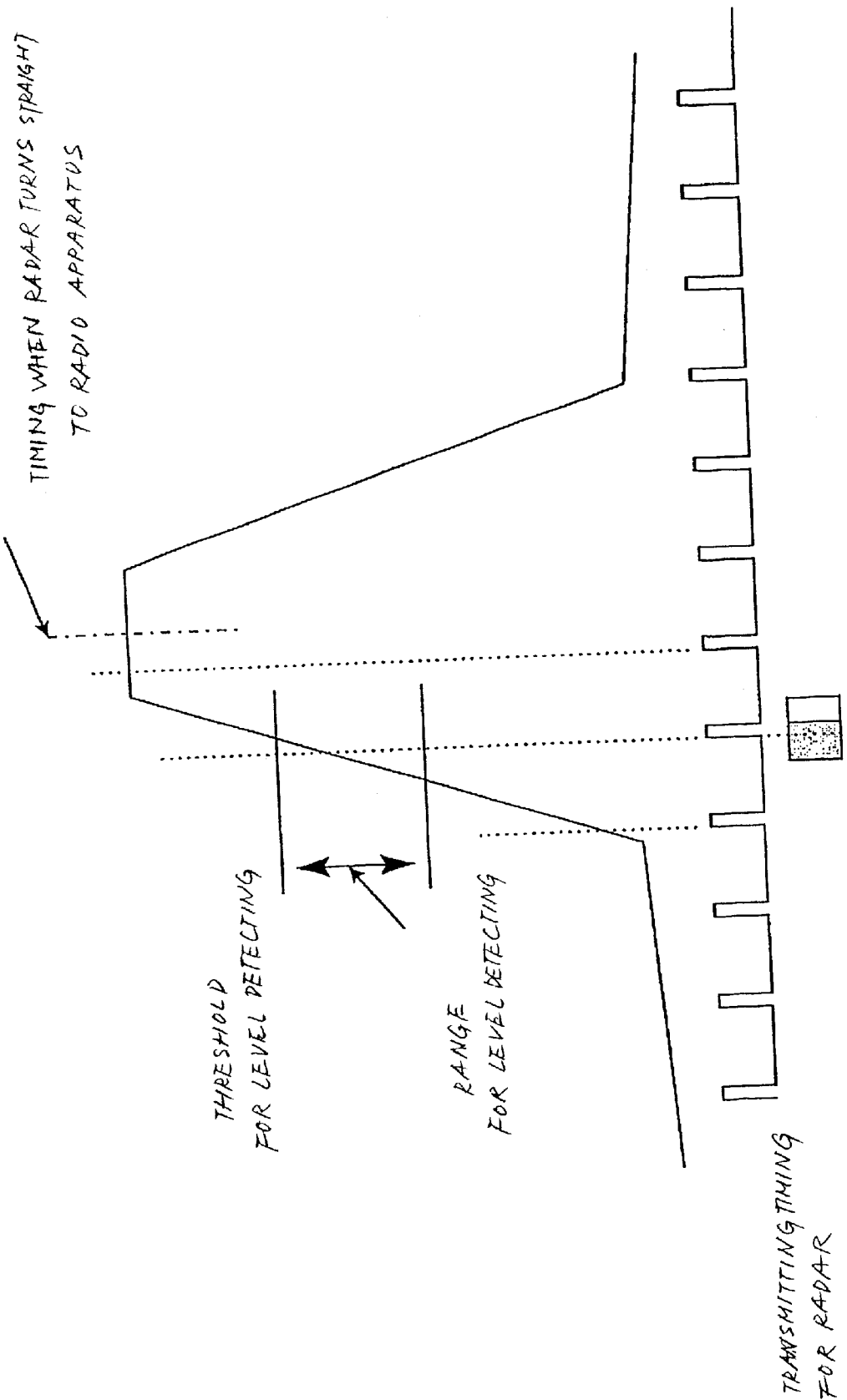
FIG. 9 shows a receiving level variation at the radio apparatus when a transmitting timing of a radar signal accords with a level detecting range because of a radar rotation.

FIG. 5 shows the general performance of a radar antenna. An antenna which is not limited to a radar has 2 peaks on both sides of a main lobe. This is called a side lobe. Generally, a difference of gain between the side lobe and the main lobe is from 20 dB to 30 dB. In this embodiment, a radio apparatus detects a radar signal using the side lobe of the radar antenna FIG. 1 is a block diagram showing a radio apparatus with an apparatus for detecting signal of the present invention. The radio apparatus 5 is comprised of transmitter 51, receiver 53 and local oscillator 52 and communicates through an air interface. As an additional circuit for the radio apparatus 5, coupler 1 is connected with antenna 4, mixer 2, the transmitter 51 and the receiver 53. A coupler is used for diverging a part of the main signal. For example, a coupler for 20 dB diverges a part of an input signal (1/100 signal of input signal) from the antenna 4. In the preferred embodiment, the coupler 1 is a directional coupler which is comprised of micro strip line and usually has a difference between the degree of coupling for the signal from antenna 4 and degree of coupling for the output signal from transmitter 51. The former degree of coupling is tight coupling and the latter degree of coupling is loose coupling. According to the difference of the degree of coupling, it becomes easy to detect a receiving signal from another radio apparatus (not shown) which uses an adjacent frequency through the antenna 4.

The mixer 2 is connected with the local oscillator 52 and the detector 3. For example, the mixer 2 uses nonlinear characteristic of FET (Field Effect Transistor) for high frequency area. Input signal from antenna is converted to low frequency which is difference of input signal and local frequency.

The detector 3 is connected with the mixer 2, and detects a transmitting signal from a radar by using a threshold. The threshold is set according to a level during a stable time period which is lower than a maximum receiving level and decided by a side lobe characteristic of a radar.

Figure 2:
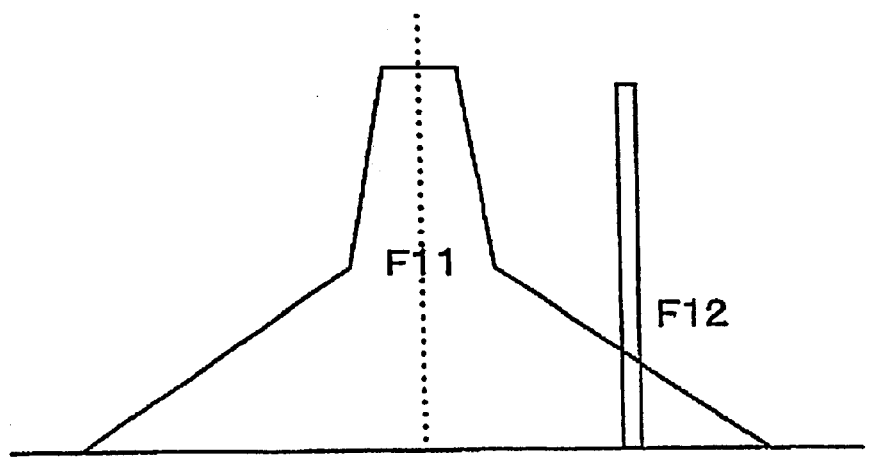
FIG. 2 shows a relation of frequency when a radar signal is inputted into radio apparatus 5 in transmitting timing.
Figure 3:
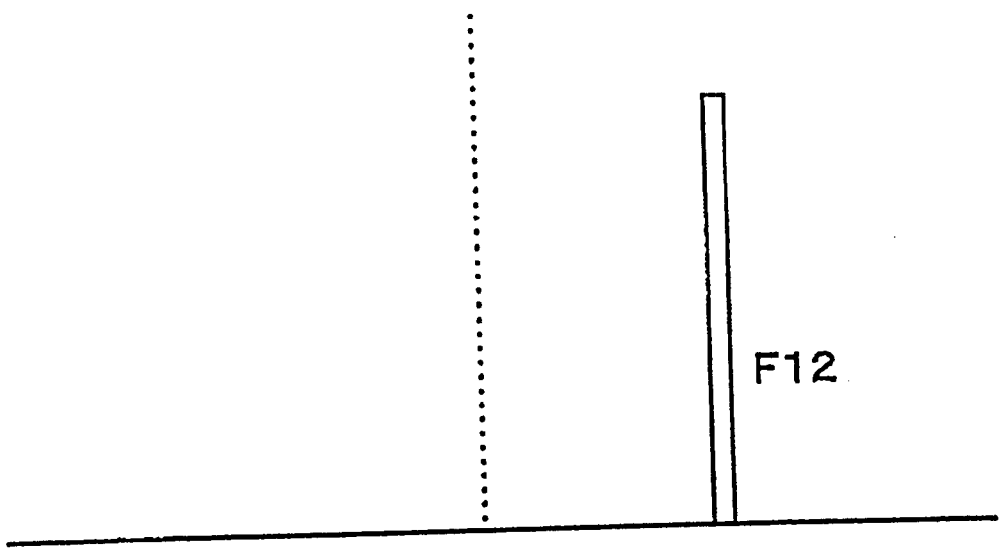
FIG. 3 shows a relation of frequency when a radar signal is inputted into radio apparatus 5 in receiving timing.

The radar signal received by the antenna 4 is inputted into the mixer 2 through the coupler 1. FIGS. 2 and 3 show a frequency relation between a radar signal F12 and transmitting a signal F11 of the radio apparatus 5. FIG. 2 shows a condition that the radar signal is inputted into the radio apparatus 5 during transmitting timing. FIG. 3 shows a condition that the radar signal is inputted into the radio apparatus 5 during receiving timing. When an input level of the radar signal is high,,the radio apparatus 5 can detect the radar signal in spite of a radar signal input during a transmitting timing. But it is difficult for the radio apparatus 5 to detect the radar signal when input radar signal level is low. It is possible to detect the radar signal in spite of low input to the radar signal level in the present invention by using the detector 3 during transmitting timing of the radio apparatus 5.

Figure 4:
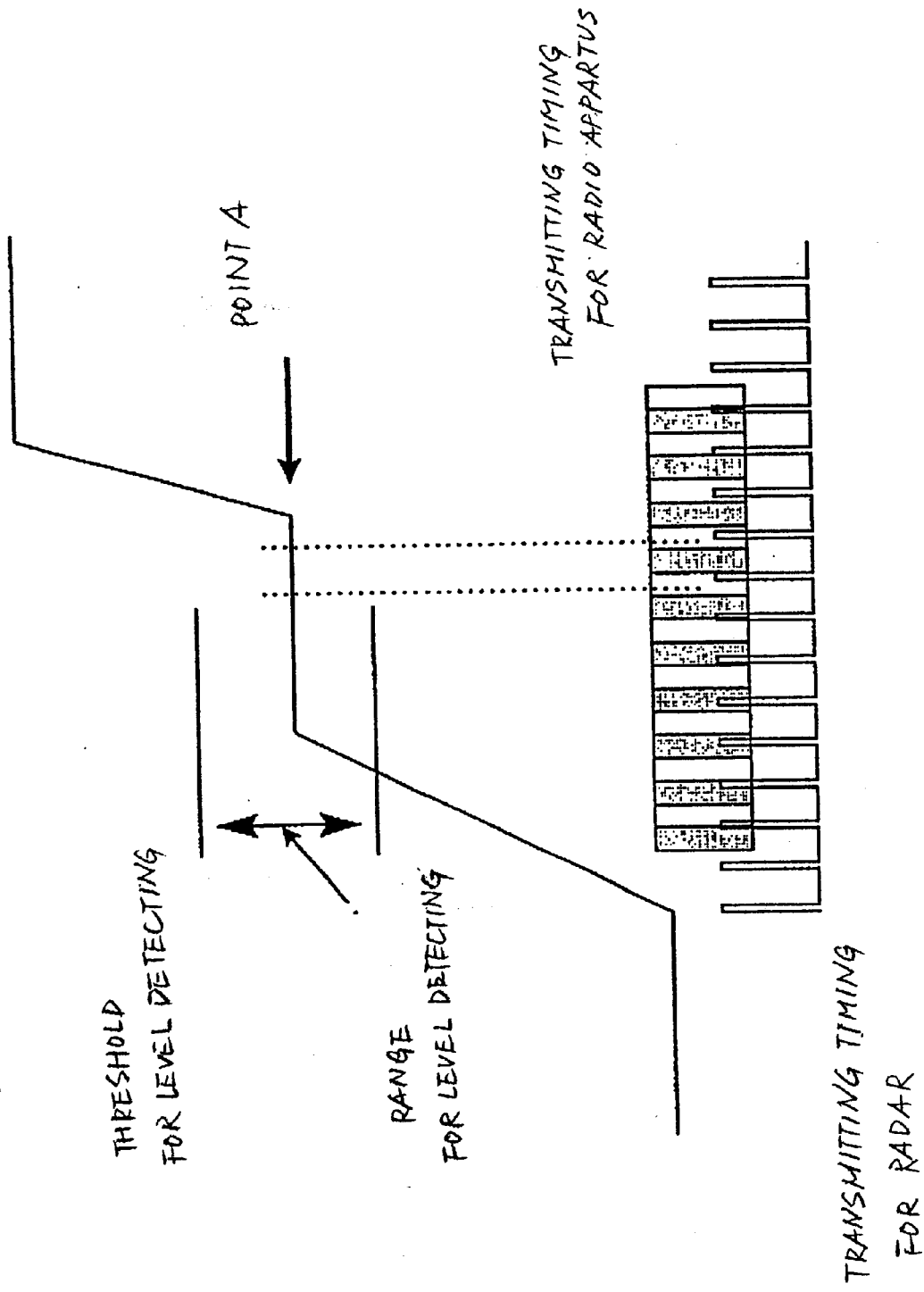
FIG. 4 shows a relation between side lobe of radar antenna and transmitting or receiving timing of the radio apparatus 5 and a radar.

FIG. 4 shows a relation between the side lobe and transmitting or receiving timing of the radio apparatus 5 and the radar. A radar signal detecting level of the radio apparatus 5 is sufficiently low when the radar turns toward a different direction from the radio apparatus 5, but the detecting level become higher increasingly according to the degree of the radar. In the process, the stable period occurs according to a side lobe characteristic of the radar antenna. The stable period is lower than the maximum receiving level and difference of level between the stable period and the maximum receiving level is decided according to the antenna characteristic. For example, the difference is from 20 dB to 30 dB. The detector 3 sets a threshold on a higher level than the stable period and detects the radar signal level. As shown in FIG. 4, the threshold is set on a higher range than point A. For example, the range is from 3 dB to 5 dB. Some range from the threshold and the point A is detection range.

When the stable period is sufficiently long against a TDD frame period of the radio apparatus 5 and transmitting a cycle of the radar, it is possible for receiving timing of the radio apparatus 5 to accord with a transmitting timing of the radar because of a relation between frame cycle of the radio apparatus 5 and transmitting a cycle of the radar. Therefore, the detector 3 can detect the radar transmitting signal surely. For example, when the radar transmitting cycle is 1 ms and TDD frame of the radio apparatus 5 is 5 ms, it is possible for the radio apparatus 5 to detect the radar signal at a rate of one signal in five received radar signals transmitted under a condition that more than 30% of TDD frame is receiving timing. The radio apparatus 5 detects the radar signal by using the side lobe characteristic during receiving timing in the present invention. Moreover, for example, it is possible to detect the radar signal by converting it into base band signal and separating it from transmitting signal to remove interference of transmitting signal.

While the present invention has been described with reference to the illustrative embodiments, it is not to be restricted by the embodiments. It is to be appreciated that those skilled in the art can change or modify the embodiments without departing from the scope and spirit of the present invention.

What is claimed is:

1. A radar signal detecting apparatus comprising:
   a coupler diverging a part of a signal from a received signal;
   a local oscillator outputting a local signal;
   a mixer converting the diverged signal multiplied by the local signal into a low frequency signal; and
   a detector detecting a radar signal from the low frequency signal by using a threshold above a side lobe of a radar and by using a detecting level range between the threshold and a level below the side lobe.

2. The radar signal detecting apparatus according to claim 1 wherein the detector halts or attenuates a transmitting signal when a received signal level is over the threshold.

3. The radar signal detecting apparatus according to claim 1 wherein the coupler is a directional coupler comprised of micro strip line.

4. The radar signal detecting apparatus according to claim 3 wherein the directional coupler has tight coupling for signal from an antenna and loose coupling for signal from a transmitter.

5. A radar signal detecting apparatus comprising:
   diverging means for diverging a part of a signal from a received signal;
   oscillating means for outputting a local signal;
   converting means for converting the diverged signal multiplied by the local signal into a low frequency signal; and
   detecting means detecting a radar signal from the low frequency signal by using a threshold above a side lobe of a radar and by using a detecting level range between the threshold and a level below the side lobe.

6. The radar signal detecting apparatus according to claim 5 wherein the detector means halts or attenuates a transmitting signal when a received signal level is over the threshold.

7. The radar signal detecting apparatus according to claim 5 wherein the converting means is a directional coupler comprised of micro strip line.

8. The radar signal detecting apparatus according to claim 7 wherein the directional coupler has tight coupling for a signal from an antenna and loose coupling for a signal from a transmitter.

* * * * *